United States Patent
Nagaoka et al.

[11] Patent Number: 6,074,190
[45] Date of Patent: Jun. 13, 2000

[54] MULTILAYER INJECTION MOLDING MACHINE AND INJECTION UNIT CONNECTING DEVICE

[75] Inventors: Tsutomu Nagaoka, Takasago; Shoji Sato, Sayama, both of Japan

[73] Assignee: Kabushiki Kaisha Kobe Seiko Sho, Kobe, Japan

[21] Appl. No.: 08/960,358

[22] Filed: Oct. 29, 1997

[30] Foreign Application Priority Data

Oct. 29, 1996 [JP] Japan ................................. 8-304071
Nov. 21, 1996 [JP] Japan ................................. 8-327625

[51] Int. Cl.⁷ .................................................. B29C 45/13
[52] U.S. Cl. ......................... 425/130; 425/562; 425/564
[58] Field of Search .................... 425/130, 562, 425/564, 566

[56] References Cited

U.S. PATENT DOCUMENTS

| | | |
|---|---|---|
| 4,117,955 | 10/1978 | Sokolow . |
| 4,542,054 | 9/1985 | Fillmann . |
| 4,710,118 | 12/1987 | Krishnakumar et al. . |
| 4,715,802 | 12/1987 | Arai . |
| 4,946,365 | 8/1990 | Kudert et al. ............................ 425/130 |

FOREIGN PATENT DOCUMENTS

| | | |
|---|---|---|
| 0 205 710 | 12/1986 | European Pat. Off. . |
| 0 357 301 | 3/1990 | European Pat. Off. . |
| 0 392 571 | 10/1990 | European Pat. Off. . |
| 0 768 163 | 4/1997 | European Pat. Off. . |
| 33 06 714 | 9/1983 | Germany . |
| 35 87 947 | 4/1995 | Germany . |
| 1 339 444 | 12/1973 | United Kingdom . |
| 1 399 279 | 7/1975 | United Kingdom . |
| 1 475 898 | 6/1977 | United Kingdom . |
| 1 487 187 | 9/1977 | United Kingdom . |
| 1 595 806 | 8/1981 | United Kingdom . |
| 1 595 807 | 8/1981 | United Kingdom . |
| 2 286 795 | 8/1995 | United Kingdom . |
| WO 81/00231 | 2/1981 | WIPO . |

*Primary Examiner*—Tim Heitbrink
*Attorney, Agent, or Firm*—Oblon, Spivak, McClelland, Maier & Neustadt, P.C.

[57] ABSTRACT

A multilayer injection molding machine manufactures a molded product formed of a plurality of layers of resins or colors by press fitting resins from a core layer injection unit and a skin layer injection unit to a cavity part formed by pressing and clamping a moving metal mold to a fixed metal mold fixed to a support member. The multilayer injection molding machine is formed by integrating a connecting device body interposed between the fixed metal mold and the support member so as to support the fixed metal mold to the support member and an injection unit connecting device provided on the connecting device body and having a plurality of resin passages allowing the cavity part to communicate with each injection unit.

11 Claims, 6 Drawing Sheets

MULTILAYER INJECTION MOLDING MACHINE AND INJECTION UNIT CONNECTING DEVICE

BACKGROUND OF THE INVENTION

The present invention relates to a multilayer injection molding machine capable of press fitting resins from a plurality of injection units to a cavity part within a metal mold, respectively, an injection unit connecting device therefor, and an injection molding method thereby.

In the manufacture of molded product formed of a plurality of layers of resins or colors, an injection molding machine for press fitting the resin of each layer into a metal mold in order is generally adapted, but in recent years, a multilayer injection molding machine capable of press fitting the resins of all the layers into the metal mold by one operation has been developed and adapted so that the molding time can be shortened to improve the productivity.

Figure 6:
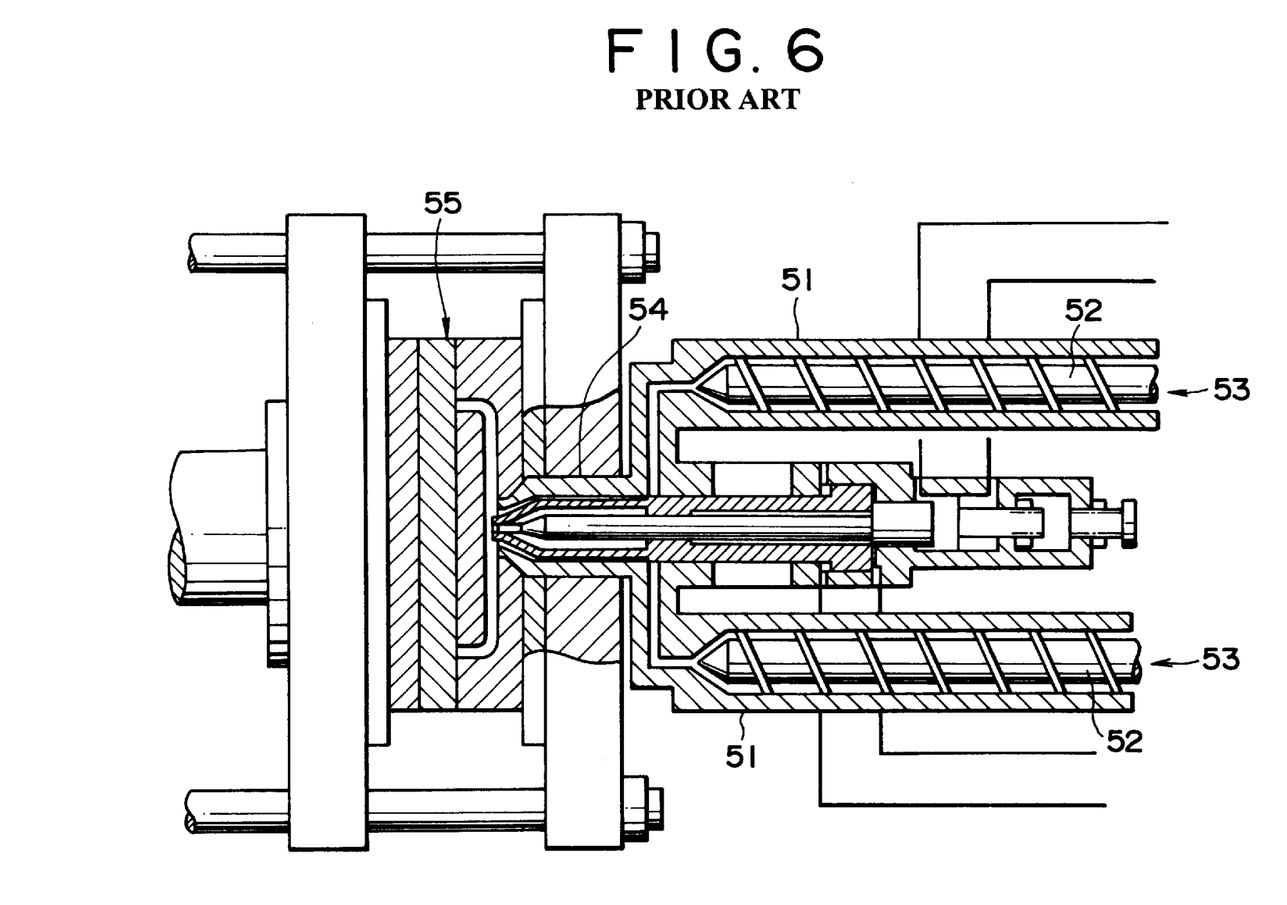
FIG. 6 is a schematic structural view of a conventional multilayer injection molding machine.

The conventional multilayer injection molding machine is constituted, as shown in FIG. 6, by juxtaposing, every resin of each layer, a plurality of (for example, two) injection units 53, 53 each of which has a heating cylinder 51 capable of raising the internal temperature to a prescribed temperature or more and an extruding screw 52 provided rotatably within the heating cylinder 51, and connecting and integrating the injection units 53, 53 together through a nozzle member 54. In injection molding, the tip of the nozzle member 54 is brought into contact with the spool hole of a metal mold 55, and the resin from each injection unit 53, 53 is then collected together in the nozzle member 54 and discharged through the tip, whereby the resin of each layer is simultaneously press fitted into the metal mold 55.

However, since the above-mentioned conventional structure having all the injection units 53, 53 connected and integrated to the nozzle member 54 is intended for an exclusive machine for a molded product having the number of layers corresponding to the number of units of the injection units 53, 53, it is required to introduce and set a multilayer injection molding machine for every molded product having each number of layers. Thus, even if a single-layer injection molding machine, for example, was introduced, new introduction of a two-layer injection molding machine is necessary in addition to this machine when a two-layer molded product is required. Therefore, existing facility equipments such as an injection molding machine, carrying device, and the like can not be effectively utilized. In a factory having no sufficient setting space, particularly, the introduction is extremely difficult since an action such as layout change of each equipment or disposal of the existing injection molding machine with the lowest frequency of use is required in order to ensure the setting space.

In recent years, it is also desired, form the view point of material cost or effective use of resources, to manufacture a molded product in which a core layer resin of low quality or low cost is thoroughly or partially covered with a desired skin layer resin. Thus, the multilayer injection molding machine having the structure described above is used also to cover such a core layer resin with the skin layer resin. However, this molding machine has a problem in that it is difficult to more surely cover the core layer resin with the skin layer resin because the core layer resin is likely to be included to the skin layer resin at the start of press fitting.

Thus, an object of the present invention is to easily manufacture a molded product having an optional number of layers by use of existing facility equipments.

Further, another object of the present invention is to surely cover a core layer resin with a skin layer resin in the manufacture of a molded product having the core layer resin covered with the skin layer resin.

SUMMARY OF THE INVENTION

The present invention involves an injection unit connecting device for a multilayer injection molding machine capable of press fitting resins from a plurality of injection units to a cavity part formed by clamping a metal mold, and this injection unit connecting device comprises a connecting device body provided on the metal mold, and a resin passage means provided on the connecting device body and having a plurality of resin passages allowing the cavity part to communicate with each injection unit described above.

Since the number of injection units can be optionally changed by changing the number of passages of the resin passages of the injection unit connecting device, a multilayer injection molding machine capable of forming a molded product having an optional number of layers can be provided. The design specifications of the connecting device body and the resin passage means are matched to an existing metal mold or injection molding machine, whereby the existing metal mold or injection molding machine can be utilized as it is to form a multilayer injection molding machine. Thus, a multilayer injection molding machine for an optional number of layers can be provided while existing facility equipments are effectively utilized.

The above-mentioned resin passage means has a first resin passage formed in the clamping direction of the metal mold and a second resin passage formed in the direction crossing the clamping direction.

Since the second resin passage is formed so as to cross the first resin passage formed in the clamping direction of the metal mold, the second resin passage can be determined toward, for example, a setting space having a vertical or horizontal room according to the equipment layout around the injection unit to be connected to the first resin passage. Thus, the existing injection molding machine can be changed into a multilayer injection molding machine for an optional number of layers without moving existing facility equipments.

The above-mentioned resin passage means also has a passage opening and closing means for opening and closing the resin passages. Since the opening and closing timing of the resin passages can be optionally set by the passage opening and closing means, the timings of start and termination of press fitting of each resin to the cavity part can be optionally set, and resin leakage can be also surely prevented.

The injection unit connecting device is integrated into a multilayer injection molding machine having an injection unit arranged in the clamping direction of the metal mold and an injection unit arranged in the direction orthogonal to the clamping direction. Thus, a multilayer injection molding machine having the structure in which each injection unit is arranged in the least obstructive orthogonal direction can be provided.

Further, the injection unit connecting device is integrated into an injection molding machine for forming a single-layer molded product so as to provide it with a plurality of injection units. Since the multilayer injection molding machine is formed by use of an existing single-layer injection molding machine, the introduction cost can be reduced.

The injection unit connecting device is also preliminarily provided on the metal mold. When a metal mold is newly manufactured, the injection unit connecting device is provided on the metal mold in advance, whereby the metal mold can be preliminarily manufactured in the state integrated with the injection unit connecting device. Therefore, only by replacing the metal mold, an existing single-layer injection molding machine or multilayer injection molding machine, for example, can be switched to a multilayer injection molding machine according to metal mold.

The present invention also involves a multilayer injection molding machine for forming a molded product having a core layer resin covered with a skin layer resin, and this multilayer injection molding machine comprises a metal mold for forming a cavity part, a core layer injection unit for press fitting the core layer resin to the cavity part through a core layer passage, a skin layer injection unit for press fitting the skin layer resin to the cavity part through a skin layer passage, and a passage opening and closing means for opening and closing the core layer passage.

The resin passage for the core layer resin is blocked at the start of press fitting of the skin layer resin, whereby the core layer resin can be prevented from being included into the skin layer resin. Since only the press fitting quantity of the core layer resin can be finely controlled by operating the resin passage for the core layer resin by the passage opening and closing means, the core layer resin can be press fitted in a desired ratio to the skin layer resin in press fitting. Thus, the core layer resin can be surely covered with the skin layer resin at the start of press fitting and in the full term of press fitting.

The above-mentioned multilayer injection molding machine further comprises the metal mold formed of a fixed mold fixed to a support member and a moving mold movable to the fixed mold so as to form a cavity part by clamping with the fixed mold, a connecting device body interposed between the fixed mold and the support member so as to fix the fixed mold to the support member, a resin passage means provided on the connecting device body and having the core layer passage and skin layer passage allowing the cavity part to communicate with each injection unit, and the passage opening and closing means provided on the connecting device body.

Thus, by matching the design specifications of the connecting device body and the resin passage means to an existing metal mold or injection molding machine, the existing metal mold or injection molding machine can be utilized as it is to form a multilayer injection molding machine. A multilayer injection molding machine for an optional number of layers can be thus provided while effectively utilizing existing facility equipments, and the core layer resin can be surely covered with the skin layer resin at the start of press fitting by the thus-obtained multilayer injection molding machine and in the full term of the press fitting thereby.

This invention further involves an injection molding method by a multilayer injection molding machine for forming a molded product having a core layer resin covered with a skin layer resin by press fitting the core layer resin and skin layer resin from the core layer injection unit and the skin layer injection unit to a cavity formed within the metal mold, respectively, and this injection molding method comprises a first process of press fitting the core layer resin together with the skin layer resin by opening a resin passage extending from the core layer injection unit to the cavity part, a second process of terminating the press fitting of the core layer resin within the press fitting period of the skin layer resin and blocking the resin passage once, and a third process of opening the resin passage again for a prescribed time so that the skin layer resin flows back to the resin passage.

The skin layer resin is actively made to flow back to the resin passage of the core layer resin, whereby only the skin layer resin is leaded even when a slight leakage or a slippage of timing of opening occurs in the resin passage of the core layer resin at the start of the following press fitting of the skin layer resin, so that the core layer resin can be surely prevented from being included into the skin layer resin. Thus, the core layer resin can be more surely covered with the skin layer resin.

DETAILED DESCRIPTION OF THE PREFERRED EMBODIMENTS

A preferred embodiment of the present invention is described in reference to FIG. 1 to FIG. 5.

Figure 3:
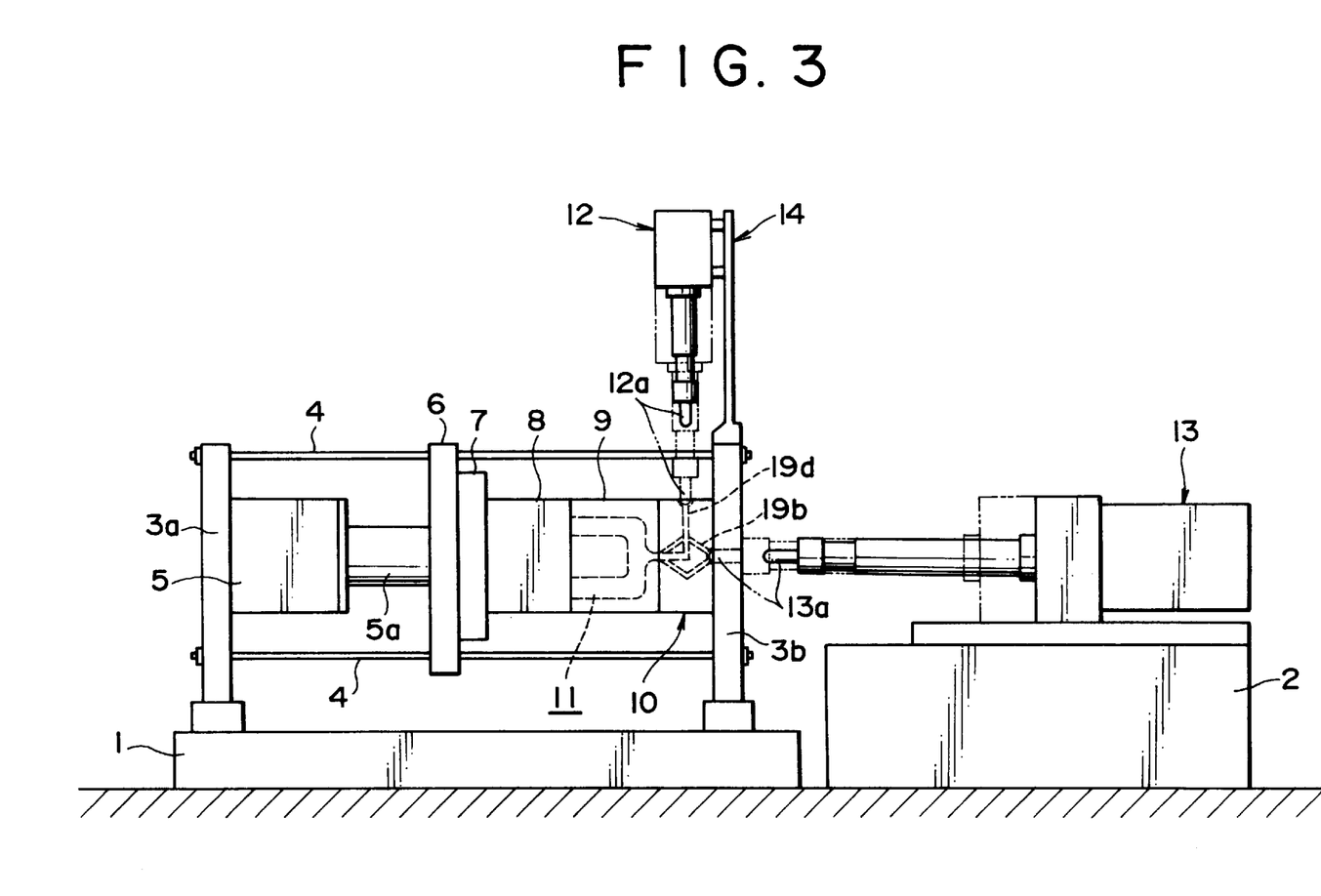
FIG. 3 is a schematic structural view of a multilayer injection molding machine according to the present invention.
Figure 4:
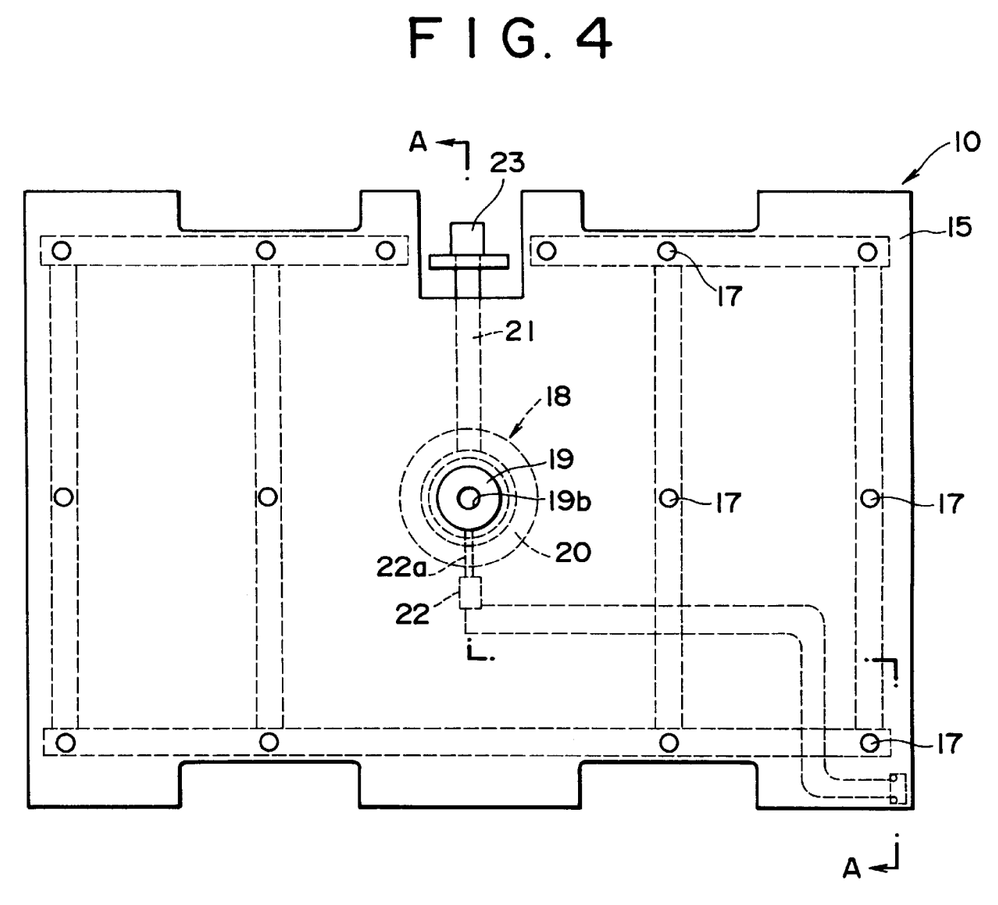
FIG. 4 is a plane view of the injection unit connecting device.

A multilayer injection molding machine according to this embodiment has a clamping base 1 and an injection unit placing base 2 as shown in FIG. 3. Support members 3a, 3b are provided vertically on both end parts of the clamping base 1, and bar-like guide members 4 are provided horizontally at each corner between the support members 3a, 3b. A metal mold opening and closing cylinder 5 is provided on one support member 3a situated to the left in the drawing in such a manner that a cylinder rod 5a is opposed to the other support member 3b, and a guide engaging member 6 is provided on the top end of the cylinder rod 5a. The guide members 4 pierce through each corner part of the guide engaging member 6 in such a manner as to be slidable, and the guide engaging member 6 is moved along the guide members 4, thereby regulating the advancing and retreating direction of the cylinder rod 5a of the metal mold opening and closing cylinder 5.

A moving mold 8 is provided on the guide engaging member 6 through a mold board 7. A fixed mold 9 connected to the back surface of an injection unit connecting device 10 is opposed to the moving mold 8. The front surface circumferential part of the injection unit connecting device 10 is fixed to the other support member 3b. Thus, the fixed mold 9 is laid in the state fixed to the other support member 3b through the injection unit connecting device 10, and the moving mold 8 is brought into contact with the fixed mold 9 and clamped therewith by the metal mold opening and closing cylinder 5, whereby a cavity part 11 is formed in the inner part by the moving mold 8 and the fixed mold 9.

Two kinds of resins formed of a core layer forming the inner part of a molded product and skin layer for covering the core layer are simultaneously press fitted to the cavity part 11 through the injection unit connecting device 10. These resins may be differed in color or function, or a resin obtained by recovering and regenerating a molded product may be used for the core layer. The resin for the core layer (core layer resin) and the resin for the skin layer (skin layer resin) are supplied from a core layer injection unit 12 and a skin layer injection unit 18, respectively. The core layer injection unit 12 is provided on a slide mechanism 14 fixed onto the upper surface of the support member 3b. The slide mechanism 14 supports the core layer injection unit 12 in such a manner as to be capable of rising and falling so that the shaft center of the nozzle part 12a of the core layer injection unit 12 is orthogonal to the clamping direction, whereby the nozzle part 12a of the core layer injection unit 12 is brought into contact with the side surface of the injection unit connecting device 10 when the resin is supplied to the cavity part 11. On the other hand, the skin layer injection unit 13 is provided on the injection unit placing base 2 in such a manner as to be capable of advancing and retreating so that the shaft center of the nozzle part 13a is parallel to the clamping direction, whereby the nozzle part 13a is brought into contact with the front surface of the injection unit connecting device 10 when the resin is supplied to the cavity part 11.

Figure 5:
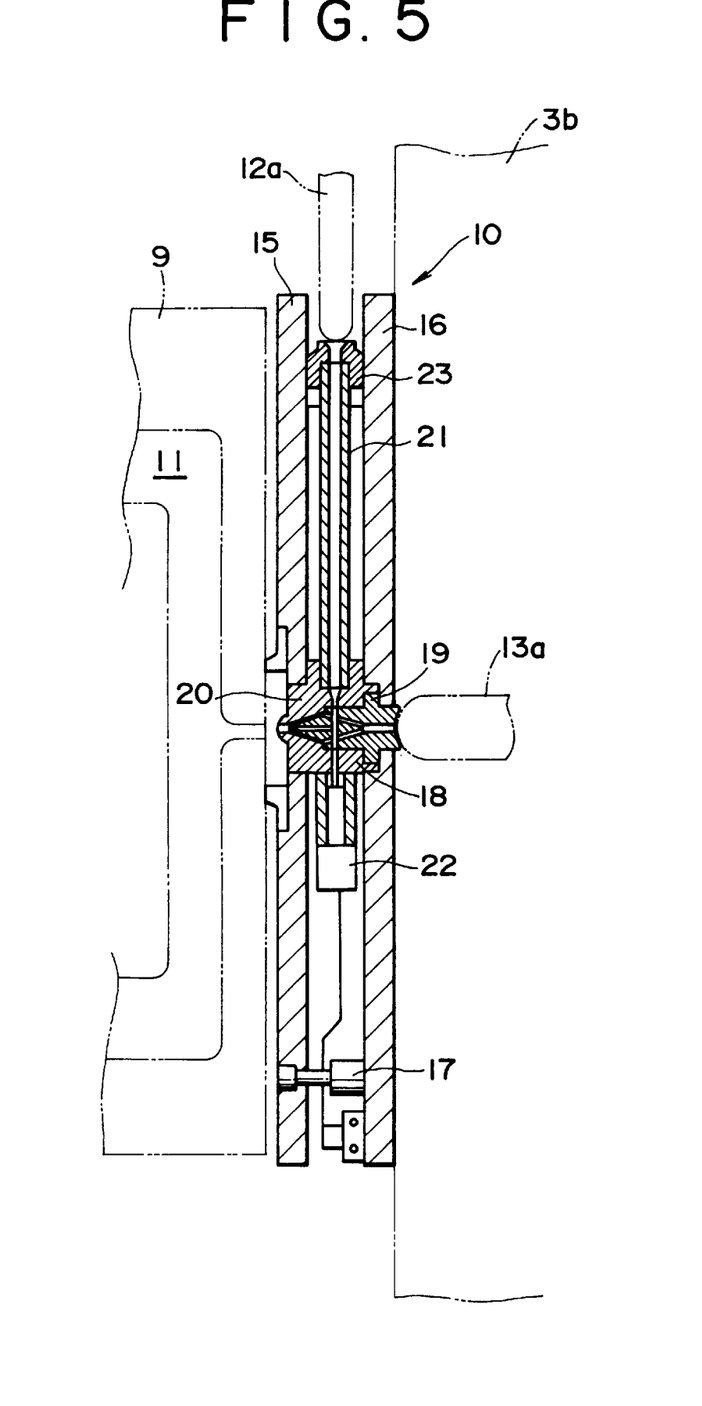
FIG. 5 is a cross-sectional view taken on line A—A of the injection unit connecting device in FIG. 4.

The injection unit connecting device 10 with which the nozzle parts 12a, 13a are brought into contact has a metal mold connecting board 15 connected to the fixed mold 9, and a fixed board 16 fixed to the support member 3b as shown in FIG. 5. The metal mold connecting board 15 and the fixed board 16 are fastened together by a plurality of bolts 17 so as to be mutually opposed with a prescribed space as shown also in FIG. 4. A resin layer forming mechanism 18 for supplying both the resins while collecting so as to cover the circumference of the core layer resin with the skin layer resin is provided between the metal mold connecting board 15 and the fixed board 16 as shown in FIG. 5.

Figure 1:
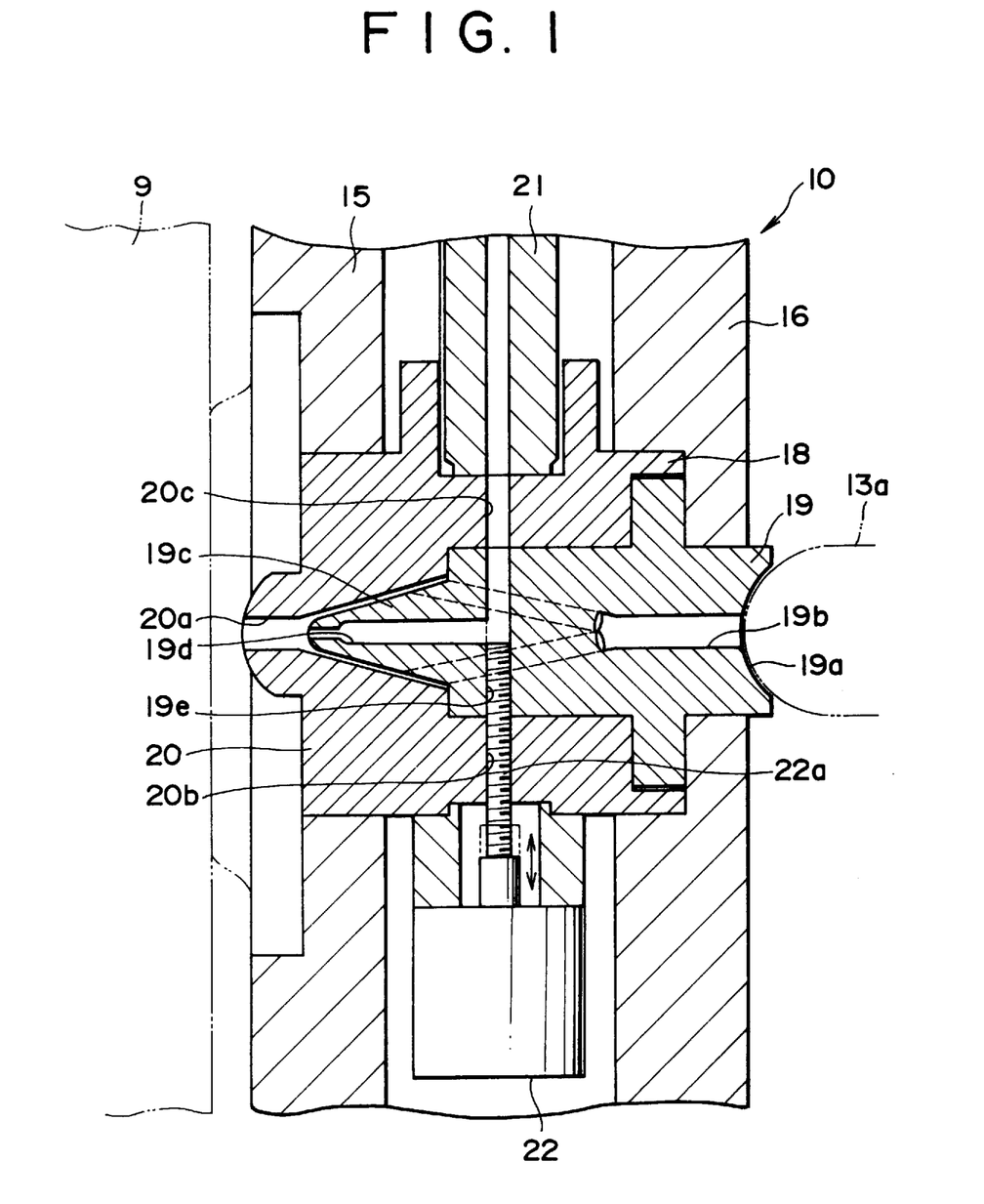
FIG. 1 is an enlarged sectional view of the essential part of an injection unit connecting device according to the present invention.

The resin layer forming mechanism 18 has a male-side laminate member 19, a female-side laminate member 20, a resin guide member 21, and a passage opening and closing member 22 as shown also in FIG. 1. The male-side laminate member 19 pierces through the center part of the fixed board 16, and is set so that the end part makes contact with the nozzle part 13a of the skin layer injection unit 13. A recessed curved part 19a is formed on the male-side laminate member 19 so as to make face contact with the tip part of the nozzle part 13a, and one end of a skin layer passage 19b for conducting the resin from the nozzle part 13a is opened in the center part (bottom part) of the recessed curved part 19a. The skin layer passage 19b is formed in such a manner as to be extended in the axial center direction of the male-side laminate member 19, then branched in a plurality of directions (for example, four directions) around the axial center, and opened in a plurality of positions on the other wall surface.

On the other side of the male-side laminate member 19 where the skin layer passage 19b is opened in a plurality of positions, a conical inclined protruding part 19c is formed. The skin layer passage 19b is opened in the inclined wall surface of the inclined protruding part 19c. One end of a core layer passage 19d is opened in the top part of the inclined protruding part 19c, and the core layer passage 19d is formed in such a manner as to be extended in the axial center direction of the male-side laminate member 19 (the inclined protruding part 19c), then bent at a right angle in the center position between the metal mold connecting board 15 and the fixed board 16, passed between the branched passages of the skin layer passage 19b, and opened in the side wall surface. A closed passage 19e is allowed to communicate with the bent part of the core layer passage 19d, and the closed passage 19e is formed so as to be opened in the side wall surface opposite to the bending direction of the core layer passage 19d.

The male-side laminate member 19 having the above-mentioned structure is fitted to the female-side laminate member 20. The female-side laminate member 20 pierces through the center part of the metal mold connecting board 15, and one end of a collecting passage 20a is opened in the fixed mold 9-side end part of the femlae-side laminate member 20. The collecting passage 20a is formed in such a manner as to be extended toward the inclined protruding part 19c, then increased in aperture so as to keep a fixed space wit the inclined wall surface of the inclined protruding part 19c, and blocked by the end surface of the male side laminated member 19. One-side ends of the core layer passage 20c and the closed passage 20b are opened to the side wall of the female-side laminate member 20, and the other ends of the core layer passage 20c and the closed passage 20b are allowed to communicate with the core layer passage 19d and closed passage 19e of the male-side laminate member 19. Thus, the core layer passage 20c, the core layer passage 19d after bending, the closed passage 19e, and the closed passage 20b are allowed to mutually communicate, whereby a linear through-hole is formed extending from the male-side laminate member 19 to the female-side laminate member 20 in the right-angled direction to the clamping direction.

A tubular resin guide member 21 is fixed to one side wall surface of the female-side laminate member 20 so as to communicate with the core layer passage 20c. The resin guide member 21 is formed so as to be extended from the center part on the female-side laminate member 20 side to its peripheral part between the metal mold connecting board 15 and the fixed board 16, and an adapter member 23 is provided on the end part on the peripheral part side. The nozzle part 12a of the core layer injection unit 12 is brought into contact with this adapter member 23.

On the other hand, a passage opening and closing member 22, for example, formed of a hydraulic cylinder is formed on the other side wall surface of the female-side laminate member 20. The passage opening and closing member 22 has a blocking member 22a capable of protruding and recessing as shown in FIG. 1, and the block member 22a is inserted into the closed passages 20b, 19e in liquid-tight state. The passage opening and closing member 22 lays the core layer passage 19d into the blocked state in the bent part by protruding the blocking member 22a, and also lays the core layer passage 19d into the opened state by retreating the block member 22a. The tip part of the blocking member 22a has a curved surface corresponding to the curvature radius of the core layer passage 19d, so that the flowing resistance of the resin in the bent part is reduced when the core layer passage 19d is laid into the opened state.

The operation of the multilayer injection molding machine in the above-mentioned structure is then illustrated.

As shown in FIG. 3, when a single-layer injection molding machine comprising the metal mold opening cylinder 5 and the molds 8, 9 set on the clamping base 1 through the support members 3a, 3b, and the skin layer injection unit 13 set on the injection unit placing base 2 has been in existence already, the injection unit connecting device 10, the slide mechanism 14 and the core layer injection unit 12 are assembled to this injection molding machine when it is used as a multilayer injection molding machine for two layers.

Namely, the injection unit connecting device 10 is fixed to the support member 3b as shown in FIG. 5 by mounting the fixed board 16 on the support member 3b. The fixed mold 9 is laid into the state fixed to the support member 3b through the injection unit connecting device 10 by mounting the fixed mold 9 on the metal mold connecting board 15. Thereafter, the slide mechanism 14 is mounted on the upper end part of the support member 3b as shown in FIG. 3, and the core layer injection unit 12 is mounted on the slide mechanism 14, whereby the multilayer injection molding machine for two layers is provided.

Then, the core layer resin and the skin layer resin are put to hoppers not shown of the core layer injection unit 12 and the skin layer injection unit 13, respectively. The nozzle parts 12a, 13a of the core layer injection unit 12 and the skin layer injection unit 13 are brought into contact with the adapter member 23 and the male-side laminate member 19, respectively, as shown in FIG. 1, whereby the preparation of injection molding is completed.

When the start of injection molding is instructed by pressing a molding start button or the like not shown, the multilayer injection molding machine moves the moving mold 8 toward the fixed mold 9 by the metal mold opening and closing cylinder 5, and presses the moving mold 8 to the fixed mold 9 with a prescribed pressing force to clamp them. When the cavity part 11 is formed within the molds 8, 9 by clamping, the skin layer resin is filled into the skin layer injection unit 13 and heated, and the skin layer resin laid in the fused state is discharged prior to the core layer resin. At this time, the core layer passage 19d is blocked by protruding the blocking member 22a of the passage opening and closing member 22 as shown by the two-dot chain line. Since the core layer passage 19d is thus perfectly blocked by the blocking member 22a, the core layer resin is never included into the discharged skin layer resin.

The skin layer resin flows into the skin layer passage 19b of the injection unit connecting device 10 through the nozzle part 13a, and advances while being branched in a plurality of directions in the skin layer passage 19b. The skin layer resin further advances in the skin layer passage 19b, where if flows out to the clearance between the inclined protruding part 19c of them ale-side laminate member 19 and the collecting passage 20a of the female-side laminate member 20, and flows toward the fixed mold 9 while perfectly covering the inclined wall surface of the inclined protruding part 19c.

On the other hand, the blocking member 22a of the passage opening and closing member 22 is retreated when a prescribed waiting time passed after the skin layer resin is discharged, whereby the core layer passage 19d is laid into the opened state. The core layer resin is filled in the core layer injection unit 12 and heated, and the core layer resin laid into the fused state is discharged. Although the injecting pressure of the core layer resin is set lower than the injecting pressure of the skin layer resin in this embodiment, it is varied depending on molded products, and may have the reverse pressure relation.

The core layer resin flows into the core layer passages 20c, 19c of the female-side laminate member 20 and the male-side laminate member 19 through the resin guide member 21, and flows out from the tip part of the inclined protruding part 19c after the advancing direction is turned by the blocking member 22a. At this time, the skin layerresin discharged in advance is collected in the top part of the inclined protruding part 19c along the inclined wall surface of the inclined protruding part 19c. Thus, the core layer resin flowing out through the tip part of the inclined protruding part 19c is passed through the collecting passage 20a together with the skin layer resin while its circumference is perfectly covered with the skin layer resin, and press fitted into the cavity part 11 of the fixed mold 9.

Figure 2:
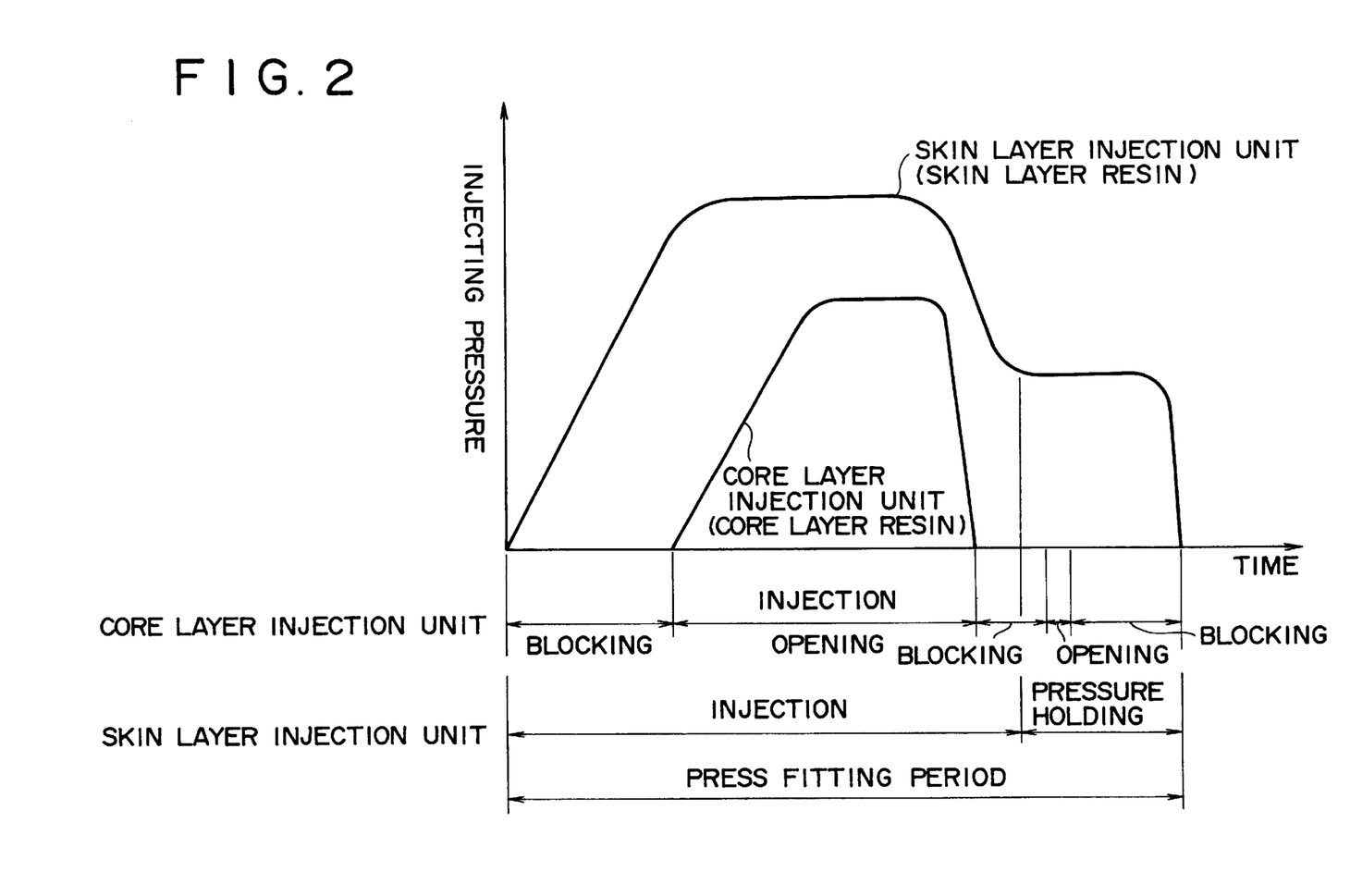
FIG. 2 is a view illustrating the press fitting state by each injection unit.

In the press fitting of the skin layer resin and the core layer resin, the injection of the core layer resin is terminated prior to the injection of the skin layer resin as shown in FIG. 2, and the core layer passage 19d is blocked by advancing the blocking member 22a to the passage opening and closing member 22. Thereafter, the core layer passage 19d if opened by retreating the blocking member 22a to the passage opening and closing member 22 in the pressure holding period of the skin layer resin, whereby the skin layer resin present in the collecting passage 20a is made to flow back to the core layer passages 19d, 20c. After the lapse of a time possibly necessary to fill the core layer passage 19d, 20c with a sufficient quantity of the skin layer resin ,the core layer passage 19d is blocked by advancing the blocking member 22a.

The skin layer resin and the core layer resin are press fitted in a prescribed quantity unit in this way, and the injection molding machine is laid into waiting state when one injection molding is completed, and repeats a series of operations described above again when the start of the following injection molding is instructed. Since only the skin layer resin is present in the core layer passage 19d blocked by the blocking member 22a, press fitting can be performed while surely preventing the inclusion of the core layer resin into the skin layer resin in the initial state of press fitting in the following injection molding.

As described above, the injection unit connecting device 10 of this embodiment, which is to form a multilayer injection molding machine capable of press fitting resins from the core layer injection unit 12 and the skin layer injection unit 13 to the cavity part 11 formed by pressing and clamping the moving mold 8 to the fixed mold 9 fixed to the support member 3b, respectively, as shown in FIG. 3, comprises a connecting device body (the metal mold connecting board 15, the fixed board 16), and a resin passage means (the male-side laminate member 19, the female-side laminate member 20, the resin guide member 21) provided on the connecting device body and having a plurality of resin passages (the skin layer passage 19b, the core layer passage 19d, and the like) allowing the cavity part 11 to communicate with each injection unit 12, 13.

In this embodiment, the multilayer injection molding machine having two injection units formed of the core layer injection unit 12 and the skin layer injection unit 13 was used for illustration. The present invention is not limited to this structure, but a multilayer injection molding machine having three or more injection units can be used by using the number passages in the male-side laminate member 19 and the female-side laminate member 20. The injection unit connecting device 10 is desirably provided on the fixed mold 9 or the moving mold 8 in advance.

Since then umber of the injection units 12, 13 can be optionally changed by changing the number of passages of the core layer passage 19d and the like of the injection unit connecting device 10, a multilayer injection molding machine capable of forming a molded product having an optional number of layers can be easily provided. By matching the design specifications of the metal connecting board 15, the male side laminated member 19 and the like to the existing fixed mold 9 or injection molding machine, the existing fixed mold 9 or injection molding machine can be used as it is to form a multilayer injection molding machine. Thus, the multilayer injection molding machine can be provided while effectively utilizing the existing facility equipments.

Further, since the fixation of the mold 9 to the support member 3b is completed simultaneously with the mounting of the injection unit connecting device 10 by interposing the connecting device body between the fixed mold 9 and the support member 3b, the multilayer injection molding machine can be more easily provided.

The resin passage means (the male-side laminate member 19, the female-side laminate member 20, the resin guide member 21) of the injection unit connecting device 10 in this embodiment has, as shown in FIG. 1, the skin layer passage 19b (first resin passage) formed in the clamping direction of the molds 8, 9 and the core layer passages 19d, 20c (second resin passage) formed in the direction orthogonal to the clamping direction. The forming direction of the second resin passage such as the core layer passage 20c or the like is not needed to be set to the direction orthogonal to the clamping direction, and may be a direction crossing at an optional angle, for example, in vertical direction or horizontal direction.

According to the equipment layout around the skin layer injection unit 13 to be connected to the skin layer passage 19b (first resin passage), the core layer passage 20c or he like (second resin passage) can be determined toward a setting space having, for example, a vertical or horizontal room. Thus, an existing injection molding machine can be changed to a multilayer injection molding machine for an optional number of layers without moving the existing facility equipments.

The injection unit connecting device 10 of this embodiment also comprises the passage opening and closing member 22 (passage opening and closing means) capable of opening and closing the core layer passage 19d. The passage opening and closing means may be constituted so as to open and close the skin layer passage 19b as occasion demands, in addition to the opening and closing of the core layer passage 19d. Although the passage opening and closing member 22 is formed of a hydraulic cylinder in this embodiment, any mechanism capable of advancing and retreating the blocking member 22a such as air cylinder, screw driving or link mechanism, or the like can be adapted. Since the opening and closing timing of the skin layer passage 19b can be optionally set by the passage opening and closing member 22, the timings of start and termination of press fitting to the cavity part of each resin can be optionally set, and resin leakage can be also surely prevented.

The multilayer injection molding machine of this embodiment comprises, as shown in FIG. 3, the injection unit connecting device 10 integrated thereto so as to provide the core layer injection unit 12 arranged in the closing direction and the skin layer injection unit 13 arranged in the direction orthogonal to the closing direction. Thus, a multilayer injection molding machine having each injection unit 12, 13 arranged in the least obstructive orthogonal direction is provided. In this embodiment, a vertical arrangement structure in which the core layer injection unit 12 is arranged above the injection unit connecting device 10 is used for illustration, but a horizontal arrangement structure in which the core layer injection unit 12 is arranged on the side of the injection unit connecting device 10 may be also adapted. Further, instead of the horizontal type clamping part (clamping direction) in this embodiment, vertical type also can be adapted.

Since the multilayer injection molding machine of this embodiment is formed by integrating the injection unit connecting device 10 into a single-layer injection molding machine having the skin layer injection unit 13 so as to provide it with the core layer injection unit 12, the introduction cost can be reduced.

The multilayer injection molding machine of this embodiment, which is to form a molded product having the core layer resin covered with the skin layer resin by press fitting the core layer resin and the skin layer resin from the core layer injection unit 12 and the skin layer injection unit 13 to the cavity part 11 formed within the metal molds 8, 9, respectively, further comprises the passage opening and closing member 22 (passage opening and closing means) for opening and closing the core layer passage 19d (resin passage) extending from the core layer injection unit 12 to the cavity part 11. Although the passage opening and closing member 22 is formed of a hydraulic cylinder in this embodiment, a structure capable of advancing and retreating the blocking member 22a such as air cylinder, screw driving or link mechanism, or the like may be adapted.

Thus, the core layer resin can be prevented from being included into the skin layer resin by blocking the core layer passage 19d at the start of press fitting of the skin layer resin. Since only the press fitting quantity of the core layer resin can be finely controlled by regulating the advancing quantity of the blocking member 22a, the core layer resin can be press fitted in a desired ratio to the skin layer resin. Thus, the core layer resin can be surely covered with the skin layer resin at the start of press fitting and in the full term of press fitting.

The injection molding method of this embodiment comprises press fitting the core layer resin together with the skin layer resin by the opening of the core layer passage 19d (first process); opening the core layer passage 19d to start the press fitting, terminating the press fitting of the core layer resin within the press fitting period of the skin layer resin, and blocking the passage once (second process); and opening the core layer passage 19d again for a prescribed time so that the skin layer resin flows back to the core layer passage 19d (third process). The core layer passage 19d is opened in the pressure holding during the press fitting period as shown in FIG. 2 in this embodiment, but the core layer passage 19d may be opened for a prescribed time in the injection of the skin layer resin without being limited by this.

The skin layer resin is actively made to flow back to the core layer passage 19d after the completion of press fitting of the core layer resin, whereby the core layer resin can be surely prevented from being included into the skin layer resin even if a slight leakage or a slippage of opening timing occurs in the core layer passage 19d at the start of the following press fitting of the skin layer resin. Thus, the core layer resin can be more surely covered with the skin layer resin.

Although the present invention has been described in its preferred embodiments, it is to be understood that the invention is not limited thereto and that various changes and modifications may be made without departing from the spirit and scope of the invention.

What is claimed is:

1. An injection unit connecting device for a multilayer injection molding machine, said connecting device being configured to supply a plurality of resins from a plurality of injection units to a cavity inside a mold, said connecting device including a body member having resin passages coupled to the cavity through either a body member central outlet or a body member surrounding gap and to each injecting unit through a central passage portion resin receiving opening or through surrounding passage portion resin receiving openings arranged adjacent to each other, wherein a central passage portion of one of said resin passages extends in a first straight line direction from the central passage portion resin receiving opening to a central passage portion outlet opening communicating with the body member central outlet and wherein surrounding passage portions of the remaining resin passages extend outwardly in straight line directions different from each other and different from the first straight line direction to surrounding passage outlet openings communicating with the body member surrounding gap from the surrounding passage portion resin receiving opening.

2. The injection unit connecting device as defined in claim 1, wherein the mold comprises a fixed mold member fixed to a support member and a movable mold member which is movable relative to the fixed mold member so as to form the cavity by a clamping together of the fixed mold member and the movable mold member, wherein the body member is interposed between the fixed mold member and the support member so as to fix the fixed mold member to the support member.

3. The injection unit connecting device as defined in claim 1, wherein the first straight line direction is a direction of movement for the movable mold member.

4. The injection unit connecting device as defined in claim 1, wherein the central passage portion resin receiving opening is opened and closed by a movable member.

5. The injection unit connecting device as claimed in claim 1, wherein the injection unit connecting device is integrated into a multilayer injection molding machine having at least one injection unit arranged in the first straight line direction and at least one other injection unit arranged in a second straight line direction orthogonal to the first straight line direction.

6. The injection unit connecting device as defined in claim 1, wherein the injection unit connecting device is integrated into an injection molding machine configured to form molded product having a core resin layer surrounded by a skin resin layer.

7. The injection unit connecting device as defined in claim 1, wherein the body member is preliminarily provided on the mold.

8. A multilayer injection molding machine for forming a molded product having a core layer resin covered with a skin layer resin, comprising:

a mold having a cavity;

a core layer resin injection unit configured to press fit the core layer resin into the cavity through a central passage portion in a connecting body member, said central passage portion extending in a first straight line direction from a core layer resin receiving opening to a central outlet opening communicating with a central opening in the connecting body member coupled to the cavity;

a skin layer resin injection unit configured to press fit the skin layer resin into the cavity through surrounding passage portions extending outwardly from adjacent skin layer resin receiving openings in straight line directions different from each other and different from the first straight line direction to surrounding passage outlet openings communicating with a gap formed in the connecting body member surrounding the central opening in the connecting body, said gap also being coupled to the cavity; and a central passage portion opening and closing member configured to open and close the core layer resin receiving opening in the central passage portion.

9. The multilayer injection molding machine as defined in claim 8, wherein the mold comprises a fixed mold member fixed to a support member and a movable mold member configured to be movable relative to the fixed mold member to form the cavity by clamping the movable mold member to the fixed mold member and the connecting body member is interposed between the fixed mold member and the support member so as to fix the fixed mold member to the support member, said connecting body member further including the opening and closing member.

10. The multilayer injection molding machine as defined in claim 9, wherein the surrounding passage portions are formed in directions crossing a direction in which the movable member moves.

11. The multilayer injection molding machine as defined in claim 9, wherein one of the core layer resin injection unit or the skin layer resin injection unit is arranged in a direction orthogonal to a direction in which the moving member moves.

* * * * *